INVENTORS
LUDVIK J. KOCI,
ROBERT D. ANDERSEN and
IVAR JEPSON
BY
ATTORNEYS

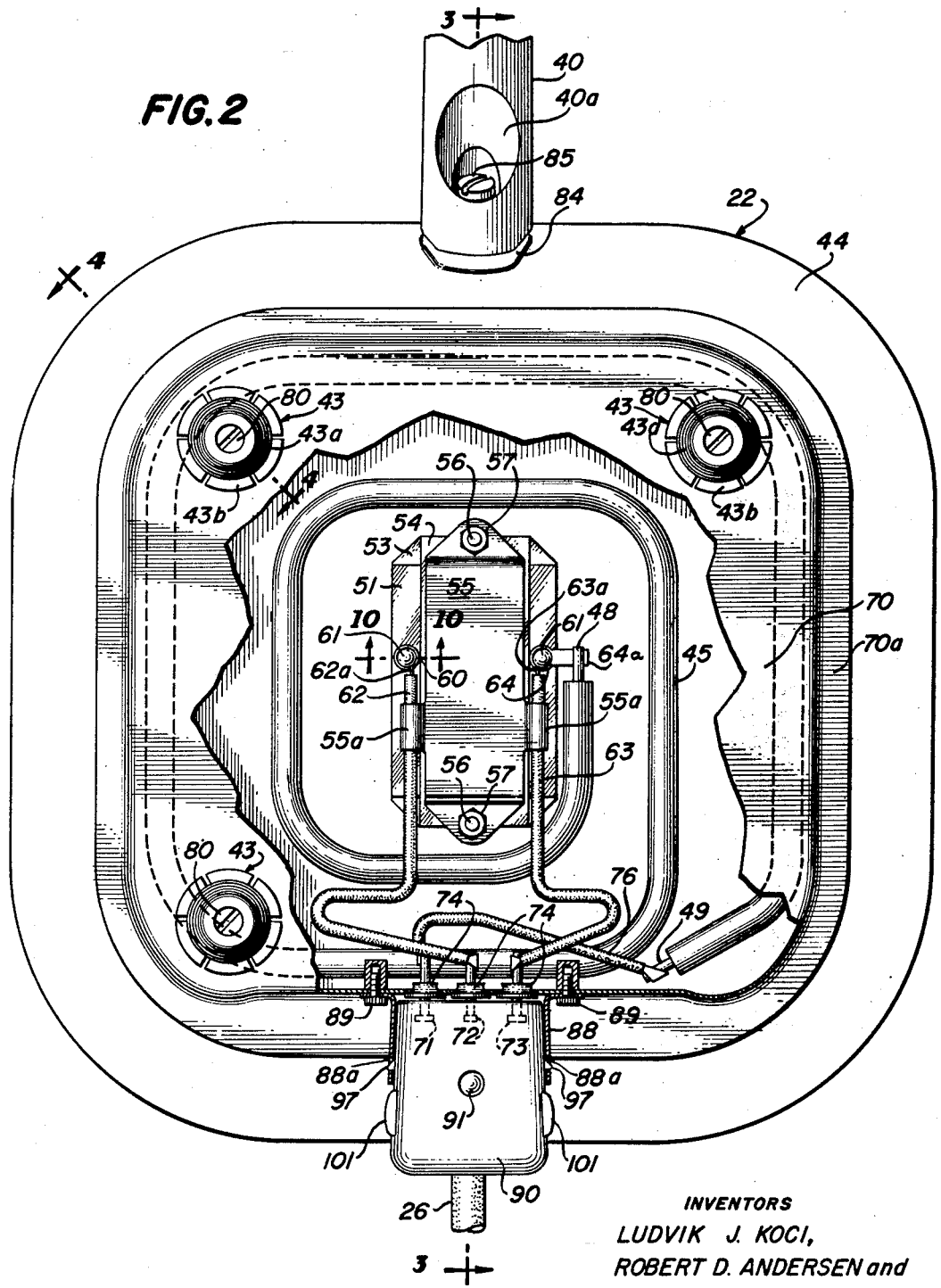

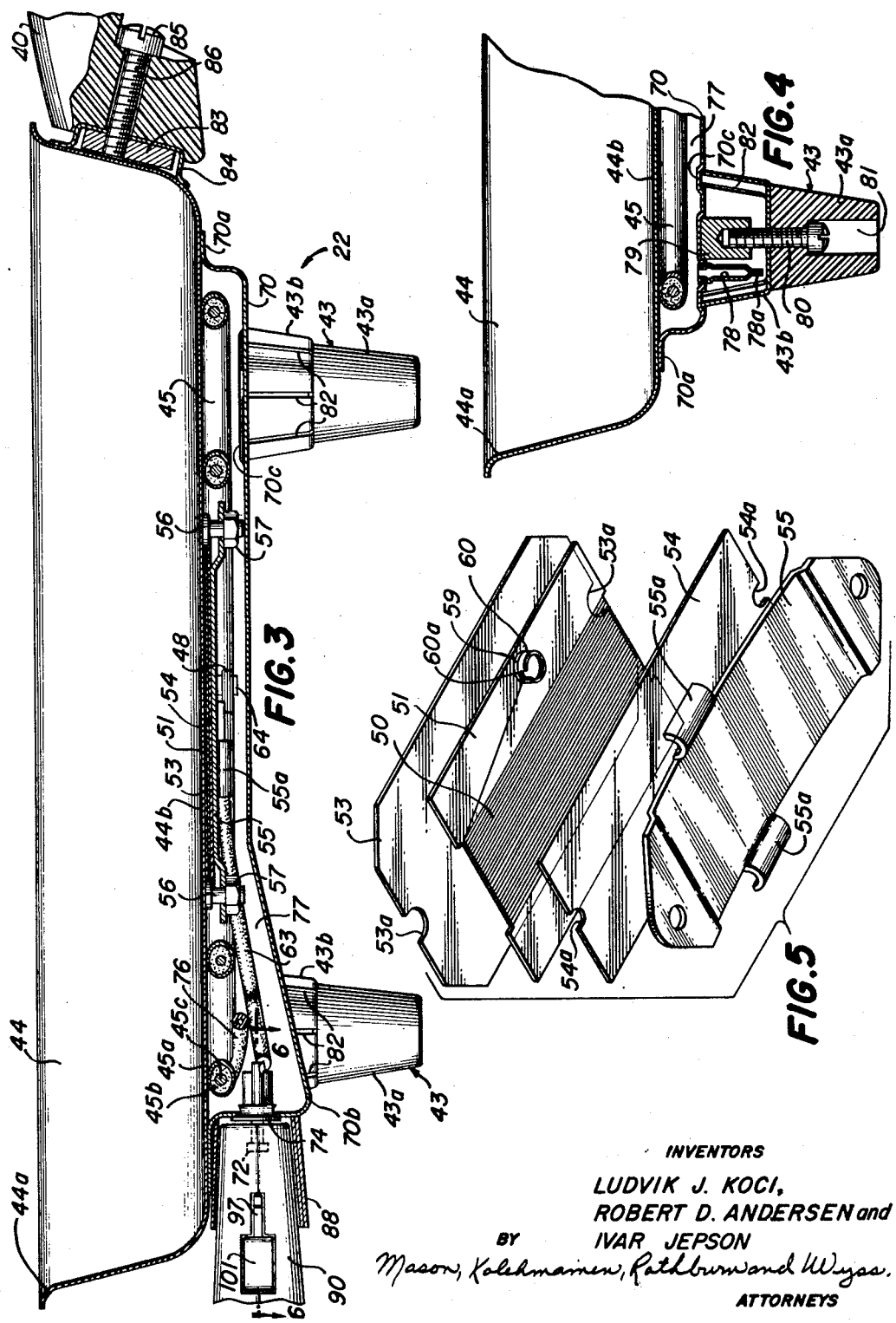

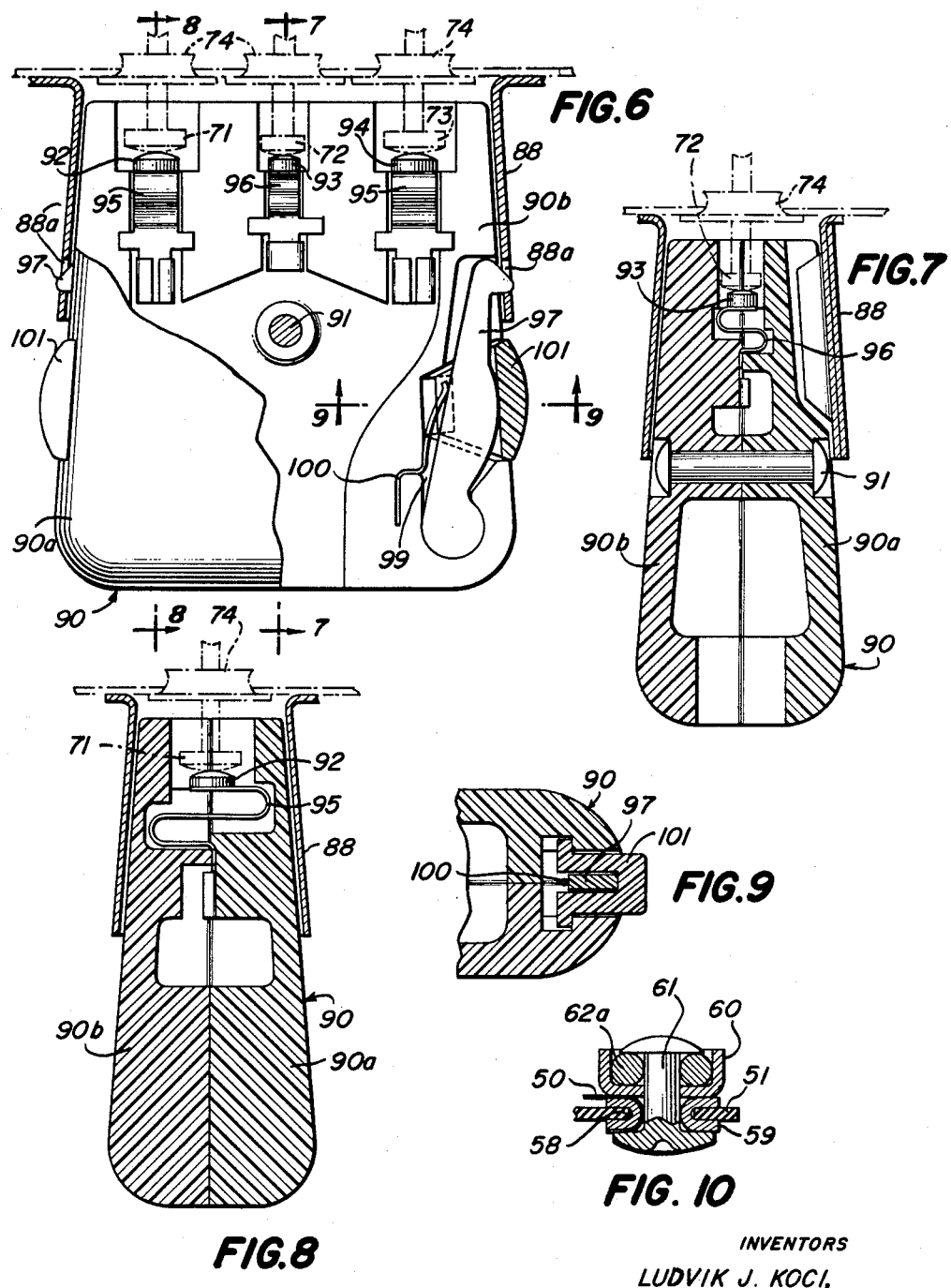

July 23, 1963  L. J. KOCI ETAL  3,098,918
REMOTELY CONTROLLED ELECTRIC HEATING AND COOKING VESSELS
Filed June 11, 1956  7 Sheets-Sheet 5

INVENTORS
LUDVIK J. KOCI,
ROBERT D. ANDERSEN
and IVAR JEPSON
BY
ATTORNEYS

July 23, 1963  L. J. KOCI ETAL  3,098,918
REMOTELY CONTROLLED ELECTRIC HEATING AND COOKING VESSELS
Filed June 11, 1956  7 Sheets-Sheet 6

INVENTORS
LUDVIK J. KOCI,
ROBERT D. ANDERSEN and
IVAR JEPSON
BY Mason, Kolehmainen,
Rathburn and Wyss.
ATTORNEYS

United States Patent Office 3,098,918
Patented July 23, 1963

1

3,098,918
REMOTELY CONTROLLED ELECTRIC HEATING AND COOKING VESSELS
Ludvik J. Koci, Hinsdale, Robert D. Andersen, Elmhurst, and Ivar Jepson, Oak Park, Ill., assignors to Sunbeam Corporation, Chicago, Ill., a corporation of Illinois
Filed June 11, 1956, Ser. No. 590,694
15 Claims. (Cl. 219—20)

The present invention relates to remotely controlled electric heating and cooking vessels and, more particularly, to cooking vessels with built-in heating units which may be accurately controlled at all times wth respect to temperature from a control unit remote with respect to the vessel.

Electric cooking vessels with built-in heating units have, within the last few years, become increasingly popular. One such cooking vessel which has enjoyed great commercial success is disclosed and claimed in United States Letters Patent 2,744,995, granted May 8, 1956, in the name of Ivar Jepson and assigned to the same assignee as the instant application. Up until a few years ago, cooking vessels including built-in heating units and temperature control means therefor had not been sold commercially to any substantial extent, primarily due to the fact that the problem of making a water-sealed cooking unit which could readily be immersed in water had not been solved. It is clear that cooking vessels must be designed so that they can be immersed in liquid for washing purposes without any deleterious effect on either the heating unit or the temperature control therefor. It is believed that the cooking vessel disclosed and claimed in the above-mentioned Jepson patent is directed to the first of the commercially successful units which permitted immersion in water for washing purposes. Actually, the assignee of the above-mentioned patent sold on the order of a million units of the cooking vessel disclosed in that patent during the first year that the product was put on the market.

It has generally come to be recognized that a cooking vessel with a built-in heating element provides a unit which is much more satisfactory than the cooking vessels used heretofore, which were adapted to be placed on a surface unit of an electric or gas range or the like. In the first place, with a built-in heating unit a much larger proportion of the heat goes into the cooking vessel itself, and less is lost to the room or kitchen where the cooking is done. It will be appreciated that the temperature of an open gas flame or the heat produced from an electric plate, such as the surface unit of a range, varies widely, depending upon the nature of the gas, as well as the gas pressure or the voltage of the system, as the case may be, together with the various settings of the controls for controlling either the gas or electric source. Another variable that is difficult to control in the case of surface heating units of a range is the position of the cooking vessel with respect to the heating zone. Obviously, if the vessel is very close to the flame, in the case of a gas range, or the electric resistance heater, in the case of an electric range, a different type of heating would result than in the case where a substantial space is disposed between the source of heat and the cooking vessel. Moreover, in modern kitchens it is common practice to have some sort of kitchen fan which produces air currents. Even without a kitchen fan, open doors and windows may cause drafts or air currents of various sorts which can affect the heating which results from such surface units. As a result, it has been recognized that the most efficient heating is obtained when the heating unit is built directly into the vessel.

When temperature control is added to such a vessel with a built-in heating unit, the same advantages are obtained that automatic temperature control has brought to industry, to domestic heating, to domestic ironing, i.e., uniformity of heating, less constant attention and freedom from burning or spoilage. Still another advantage of a temperature-controlled cooking or heating vessel resides in the greater efficiency, since only enough heat or electricity is used to maintain the vessel at the desired temperature, whereas when manual controls are employed, usually a greater heat input than is necessary is supplied to obtain the desired heating or cooking. In the hot, humid summer months, particularly, the addition of waste heat not only adds discomfort, but actually increases the cost of air conditioning if the room in which the device is used is air conditioned, which, incidentally, is becoming very popular and is expected to increase in popularity as time goes on.

The average housewife requires an assortment of cooking vessels for performing different cooking operations; for example, a so-called frying pan is used for certain functions and deeper saucepans of various sizes are required for other functions. If a housewife had the number of cooking vessels which she ordinarily used, all of them with built-in heating units and thermostatic controls, the number of these vessels might be four or more, and in each case the thermostatic control built into the vessel might be identical. Also, the sealing problem with respect to such vessels is increased insofar as immersing the vessel in liquid for washing purposes is concerned if the thermostatic control is included in the vessel itself. It would be desirable, therefore, to provide an arrangement whereby the temperature control means for such vessels is remote from the vessels themselves and included in a wall- or counter-mounted panel or control unit or arranged in some other convenient position. In this way, the individual vessels could be simplified substantially and the problem of making them foolproof as far as immersion for washing purposes is concerned is greatly simplified. Moreover, the housewife does not normally use all of the different vessels that are employed for cooking purposes at the same time and, consequently, with temperature controls remote from the vessels, the number of control units necessary for simultaneous operation can be substantially reduced below the number of controls necessary if they were all built into the individual vessels, some of which might only occasionally be used.

Accordingly, it is an object of the present invention to provide new and improved cooking vessels and control means therefor in which the control means are disposed remote from the vessels.

It is another object of the present invention to provide an improved cooking vessel having built-in heating units and means for accurately controlling the temperature thereof at all times, which means is remote from the vessel.

Still another object of the present invention resides in the provision of an electric heating or cooking control unit whereby the temperature of a plurality of different vessels having electric heating elements built therein, and which vessels are remote from such control unit, can be controlled in a simple and foolproof manner.

It is a further object of the present invention to provide an assortment of cooking vessels with built-in heating means so that all of the vessels can readily be immersed in water for cleaning purposes and in which the control of the heating supplied by the built-in element is remote and independent from the cooking vessel and connected thereto solely by the power cord supplying electrical energy to the built-in heating unit.

It is another object of the present invention to provide a cooking vessel with built-in heating unit and temperature sensing means, whereby a remote control unit responsive to said sensing means accurately controls the energy supplied to said heating unit.

Further objects and advantages of the present invention will become apparent as the following description proceeds and the features of novelty which characterize the invention will be pointed out with particularity in the claims annexed to and forming part of this specification.

For a better understanding of the present invention, reference may be had to the accompanying drawings in which:

FIG. 2 is a greatly enlarged bottom view of a major portion of one of the cooking vessels illustrated in FIG. 1 with certain portions thereof cut away.

FIG. 3 is a sectional view taken on line 3—3 of FIG. 2, assuming that FIG. 2 shows the complete structure.

FIG. 4 is a sectional view taken on line 4—4 of FIG. 2, again assuming that FIG. 2 shows the complete structure.

FIG. 5 is an enlarged exploded perspective view of a portion of the device shown in FIGS. 2 and 3 of the drawings.

FIG. 6 is a greatly enlarged view, partly in section, of a portion of the device shown in FIG. 2 of the drawings.

FIG. 7 is a sectional view taken on line 7—7 of FIG. 6, assuming that FIG. 6 shows the complete structure.

FIG. 8 is a sectional view taken on line 8—8 of FIG. 6, also assuming that FIG. 6 shows the complete structure.

FIG. 9 is a fragmentary sectional view taken on line 9—9 of FIG. 6, assuming that FIG. 6 shows the complete structure.

FIG. 10 is a greatly enlarged sectional view taken on line 10—10 of FIG. 2.

Briefly, the present invention is concerned with electric cooking vessels which are each provided with a built-in heating unit in the form of an electric resistance element. The vessel further includes some sensing device which is responsive to changes in temperature of the vessel. The changes which the sensing device exhibits are transmitted to a remote control unit which then controls the heat supplied to the heating unit. In one modification the sensing device comprises a resistance element whose resistance changes with temperature. In another modification the resistance of the heating element itself is used as the sensing element, and in still other modifications various combinations of resistance elements and bimetallic elements are employed. Various means for amplifying the changes exhibited by the sensing devices are also disclosed.

Figure 1:
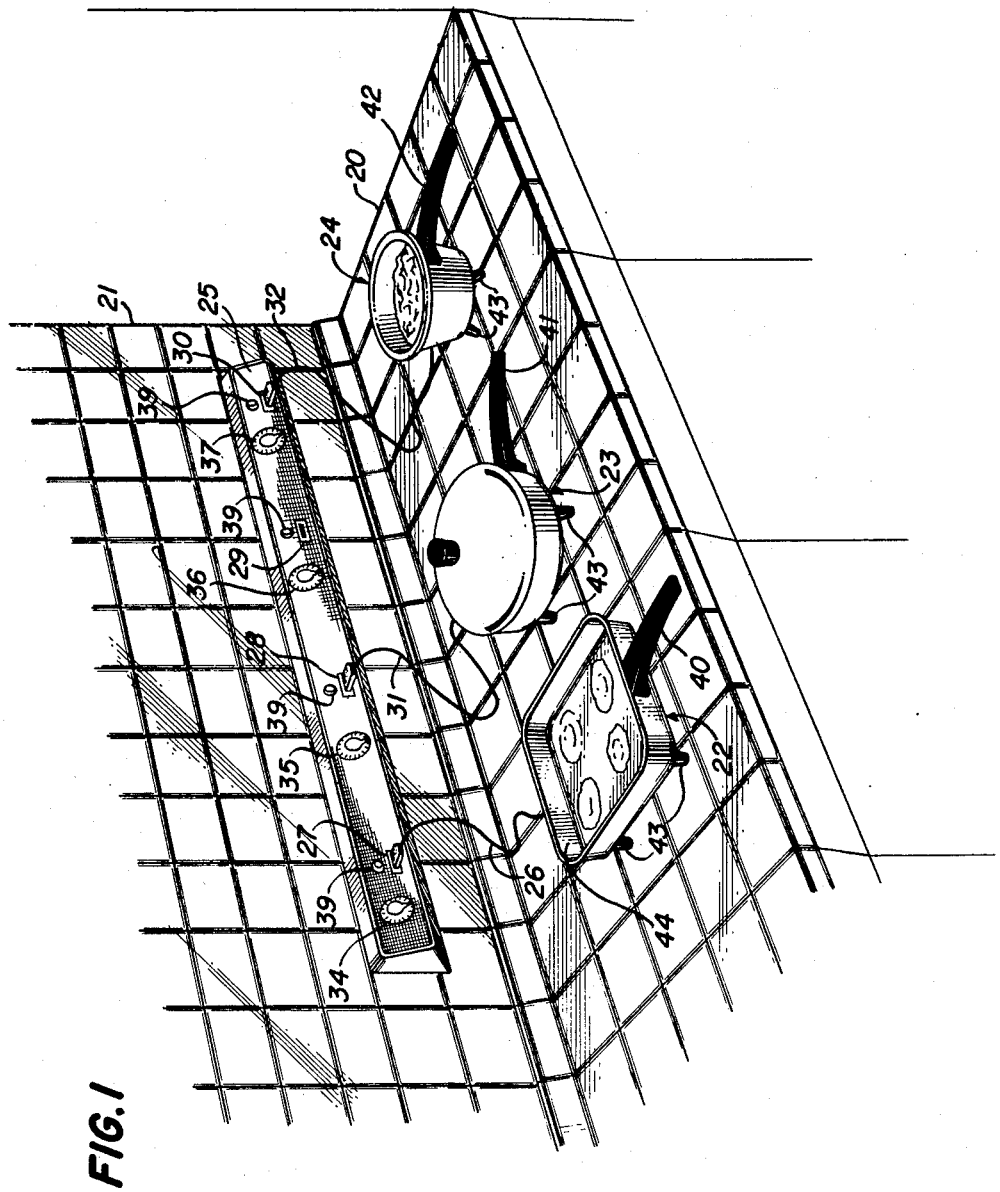
FIG. 1 is a perspective view of a portion of a kitchen illustrating an application of the remotely controlled cooking vessels of the present invention.

Referring now to FIG. 1 of the drawings, there is illustrated what might be considered a portion of the conventional counter in the kitchen of a home. This counter is generally designated by the reference numeral 20. The counter is disposed against a wall surface of the room, designated as 21, in the conventional manner. Both the wall surface and counter surface are indicated as formed of tile, but, obviously, that is by way of illustration only and any other suitable surface may be involved. Supported on the counter 20 are a plurality of cooking vessels embodying the present invention and, specifically, designated by the reference numerals 22, 23 and 24. The specific shape of these units is immaterial as far as the present invention is concerned, they being all similar from the standpoint that each includes a built-in electric heating unit. The vessel 22 might be considered a frying pan, the vessel 23 a large saucepan and the vessel 24 a smaller saucepan. Each of these vessels is illustrated as being connected by a suitable power cord to electric outlets defined as a part of a control panel unit 25, including control circuits of the present invention for selectively and accurately controlling from a remote point the temperatures of the individual vessels. As illustrated, the vessel 22 is connected by the power cord 26 to the control panel unit 25 and, specifically, to a suitable outlet provided therein and designated as 27. The control panel is, in addition, illustrated as having similar outlets 28, 29 and 30 for additional cooking vessels. A power cord 31 associated with the vessel 23 is indicated as being connected with the outlet 28. Similarly, a power cord 32, illustrated as being connected to the vessel 24, has the other end thereof associated with the outlet 30. The control panel unit 25 is, furthermore, illustrated as including a plurality of manually actuable control knobs designated as 34, 35, 36 and 37, each of which, as will become apparent from the ensuing description, is designed to control the temperature at which the cooking vessel associated with the outlets 27, 28, 29 and 30, respectively, operates. If desired, the control panel unit may include a plurality of signal lights such as 39, one associated with each outlet, which will give the operator an indication of whether or not current is flowing in the heating element of the cooking vessel connected to the associated outlet.

It will be appreciated that the particular design of the control panel unit 25 forms no part of the present invention. Actually, the control unit 25 may be built into the wall with only the outlets and control knobs being visible. This would be preferable in the case of a new home. In the case of installation in an existing home the disclosed arrangement may be preferable. In either case, it will be apparent that a substantial advantage from the standpoint of useful counter space in the kitchen is afforded by the present invention. When the housewife is not using the control panel unit 25 for cooking, the counter space 20 beneath it is ordinary counter space which can be used for any purpose. In the conventional home today, this counter space would comprise the top of a range with the surface units thereof, which do not provide a very satisfactory counter space, even when the surface units are not in use. It will also be apparent that with a conventional range a predetermined, relatively close spacing of the surface units is involved, and the housewife, if using a plurality of the surface units simultaneously, has a space problem. With the arrangement shown in FIG. 1 it is obvious that the cooking vessels may be spread over a very large counter area, limited only by the length of the power cords used therewith.

Referring again to FIG. 1 of the drawings, the vessels 22, 23 and 24 are illustrated as each being provided with an insulated handle 40, 41 and 42, respectively. However, these handles are by way of illustration only and it may well be some of these vessels would have two short handles on opposite sides thereof or other types of handles. All of the vessels are illustrated as being supported on legs, designated as 43 and described in greater detail hereinafter, which legs may, if desired, be of the type described and claimed in the above-mentioned Jepson patent.

To illustrate the details of the present invention, the cooking vessel 22 of FIG. 1 has been chosen by way of example and in FIGS. 2–10, inclusive, of the drawings the details of this vessel are fully illustrated. Obviously, the vessel 23 or 24 or some other type of cooking vessel with a built-in heating unit and means to permit remote control of the heating thereof could equally well have been chosen for this detailed description.

Referring now to FIGS. 2–10, inclusive, there is illustrated the cooking vessel 22 having the handle 40 and the plurality of supporting legs 43 referred to above, which is adapted by means of the power cord 26 to be connected to an outlet such as 27, forming part of the control panel unit 25. As illustrated, the cooking vessel 22 comprises a shallow, open-top pan or container 44, which is illustrated as of a rectangular configuration for the purpose fully discussed in the above-mentioned Jepson patent, but, obviously, it may have any other configuration. The vessel 44 may be made as a casting of light metal such as aluminum, as in the above-mentioned Jepson patent, or it may be formed of sheet metal stampings, in accordance with the disclosure of co-pending Jepson et al. application Serial No. 501,652, filed April 15, 1955, and assigned to the same assignee as the present application. As illustrated in the drawings, and particularly in FIGS. 2, 3 and 4 thereof, the vessel 44 comprises a stamping, preferably formed of aluminum or other metal, which is a good heat conductor, so as to assure uniform temperature throughout. Preferably, a rolled edge 44a is provided around the upper periphery thereof, as best shown in FIGS. 3 and 4 of the drawings. When formed as a metal stamping, the vessel 44 is formed independently and other portions thereof, as will be described hereinafter, are welded or otherwise suitably secured thereto. It will be appreciated that if the vessel 44 were formed as a casting of light metal, some of the other elements described hereinafter would be cast with the vessel and, particularly, a heating element would be cast into intimate heat exchange relationship with the cooking surfaces thereof, which cooking surface is designated in FIG. 4 of the drawings by reference numeral 44b.

For the purpose of heating the bottom of the vessel 44 which defines the cooking surface 44b to a uniform temperature there is preferably provided a heating element 45 which is illustrated in FIG. 2 of the drawings as in the shape of a two-turn pancake spiral arranged so as to supply heat uniformly over the entire area of the bottom surface of the vessel 44. The particular configuration of the heating element 45b in FIG. 2 of the drawings is by way of example only and other shapes may be employed. Preferably, the heating element 45 comprises one of the well-known sheathed type of heating elements, which, conventionally, comprise an outer metal sheath within which is disposed a suitable length of resistance wire sold under the trade name of Nichrome, this resistance wire being coiled in the form of a helix. As shown in FIG. 3 of the drawings, the heating element 45 includes a sheath 45a within which there is disposed the coiled resistance wire 45c. Surrounding the coiled resistance wire 45c within the sheath 45a is a refractory composition designated by the reference numeral 45b and commonly formed of fused magnesium oxide. This refractory material 45b centers the resistance element 45c and insulates it from the sheath. Hence, it must be a relatively good conductor of heat and yet an excellent electrical insulator. As illustrated in the drawings, the ends of the sheathed heating element 45, arranged in the form of a two-turn spiral, terminate in the electrical terminals 48 and 49, which are generally formed of rigid material projecting from the ends of the sheath 45a.

It will be appreciated that it is necessary to secure the heating element 45 in intimate heat exchange relationship with the bottom of the vessel 44 defining the cooking surface 44b. To this end, the heating element 45 is brazed or otherwise suitably secured to the bottom of the vessel 44.

For the purpose of sensing the temperature condition of the vessel 44 so that remote control of the heating thereof may be provided, some sensing means must be associated with the vessel 44. Actually, and as will be described in greater detail hereinafter, the resistance wire 45c of the sheathed heating element 45 may itself serve as the sensing element. It will be appreciated that there are resistance materials available on the market whose resistance changes with temperature and, in what is at present believed to be a preferred embodiment of the present invention, there is illustrated in FIGS. 2, 3 and 5 of the drawings a resistance wire 50 of the type which is commonly referred to as one having a positive temperature coefficient. Such resistors are formed of metallic alloys, such as nickel alloys, and are very stable. They have a positive temperature coefficient, so that an increase in temperature produces an increase in resistance. Some of these resistance wires have a positive temperature coefficient of the order of about seven-hundredths of one percent per degree Fahrenheit. However, since they are very stable, they are very desirable for use in the manner described in detail hereinafter.

To be effective, it is apparent that the sensing element generally designated by the reference numeral 50 must be mounted to have a temperature closely related to the temperature of the bottom of the vessel 44, so as to be accurately responsive to the temperature of the cooking surface 44b. To this end, the resistance wire 50 is illustrated as being wound on a suitable coil form 51, which may be formed of mica or other suitable insulating material which will withstand the temperatures involved. In an embodiment built in accordance with the present invention, the sensing element 50 comprised eighteen feet of wire formed of a nickel-iron alloy comprising 72% nickel and 22% iron. This wire had a diameter of two and one-half thousandths of an inch and its total resistance was of the order of 500 ohms when at room temperature.

For the purpose of insulating the sensing element 50, a pair of sheet mica members 53 and 54 are provided between which the coil form 51 with the sensing element 50 mounted thereon is interposed. A suitable clamping element 55 then clamps the assembled insulating members 51, 53 and 54 against the bottom of the vessel 44. The clamping member 55 is preferably bowed in its free condition, as best shown in FIG. 5, so that when clamped to the vessel 44 it firmly presses the sensing element 50 interposed between the insulating members against the bottom of the vessel. As best shown in the drawings, a pair of bolts 56 having the heads thereof welded or otherwise suitably secured to the bottom of the vessel 44 provide means whereby the clamping plate 55 may be held in the position shown in FIGS. 2 and 3 of the drawing. Suitable nuts 57 are indicated as being secured to the bolts 56 to hold the parts in assembled relationship.

For the purpose of making electrical connections between the sensing element 50 and other parts of the electrical circuit, the insulating coil form 51 is preferably provided with a pair of openings 58, one of which is clearly shown in FIG. 10 of the drawings. Inserted within the openings 58 are mounted suitable metal grommets such as 59. The opposite ends of the sensing element 50 are then pulled through a different one of the openings, such as 58, containing the grommets 59. A suitable cylindrical washer, such as 60, is then superimposed above the end of the wire defining the sensing element 50 pulled through the grommet 59 so that a suitable rivet, such as 61, may clamp the entire terminal assembly to the coil form 51 and at the same time complete the electrical connection between the sensing element 50 and a suitable conductor. As illustrated in the drawings, electrical conductors 62 and 63, which are preferably suitably insulated with a material which will withstand the temperatures involved, have the ends thereof, such as 62a and 62b, formed in a loop and disposed within the cylindrical washer, such as 60, which preferably has a notch, such as 60a, on one side thereof to permit the conductor end 62a to enter. The rivet 61 then effectively clamps the conductor end 62a in good electrical contact with the sensing element 50.

As will become apparent from the ensuing description, one terminal of the sensing element 50 and one terminal of the heating element 45 may be common and to this end the cylindrical washer associated with the conductor 63 differs slightly from the washer 60 described above and is indicated as 64 including an integral extension 64a to which the terminal 48 of the heating element 45 is electrically connected. For the purpose of maintaining the conductors 62 and 63 in position, the clamping plate 55 is preferably provided with a pair of projections 55a which overlie the conductor 62 and 63 and hold them in position. Also, to prevent relative movement of the insulating sheets 53 and 54, the ends thereof are preferably notched, as indicated at 53a and 54a, to receive the bolts 46 and thus prevent relative movement between the parts.

In order to provide a completely sealed construction which will permit immersion of the cooking vessel 22 within a washing liquid or fluid, there is provided a flanged pan-like member 70 having a peripheral flange 70a which is adapted to be secured to the bottom of the pan or container 44 in a manner to completely house the heating element 45, the sensing element 50 and its mounting and the like. As illustrated best in FIG. 3 of the drawings, this pan has a depth so as to comfortably accommodate the heating element contained therein and includes a depressed portion defining a sort of projection 70b at one portion thereof. Adjacent this depressed portion 70b and within a vertical wall thereof are a plurality of openings through which terminals 71, 72 and 73 project. Suitable glass-to-metal seals 74 are provided to permit the terminals 71, 72 and 73 to extend through this wall in hermetically sealed relationship with one portion inside the pan 70 and the other portion outside. As illustrated, the terminal 49 of the heating element 45 is connected by the suitable conductor 76 with the terminal 71. The end of the conductor 62 not connected to the sensing element 50 is connected with the terminal 72 and the end of conductor 63 not connected to the other end of the sensing element 50 and to the terminal 48 is connected to the terminal 73. With these electrical connections made, the flange 70a of pan 70 is brazed or otherwise secured to the bottom of vessel 44. Preferably, a lower melting point brazing compound is utilized so as not to affect the brazing of the heating element 45 to the bottom of the vessel by the subsequent brazing operation of pan 70.

The space designated as 77 between the pan 70 and the bottom of the vessel 44 must be completely sealed so that the vessel may be immersed in water without any possibility of moisture entering this area. Since the vessel 44 is subjected to relatively high temperatures, there is the possibility, upon sufficient increase in temperature, with the resultant corresponding increase in pressure of the air confined in the space 77 that a pressure sufficient to cause rupture of the pan 70 could result. To avoid this, the space 77 between the pan 70 and the vessel 44 is preferably evacuated. As illustrated in FIG. 4 of the drawings, a suitable evacuation tube 78 projects from the bottom of the pan 70 and the space 77 is evacuated through the tube 78, which is subsequently sealed off, such as indicated at 78a.

It will be appreciated that the bottom of the pan 70 will reach relatively high temperatures, since it is in intimate heat exchange relationship with the bottom of the vessel 44, which, in turn, is in intimate heat exchange relationship with the heating element 45. These temperatures may be in excess of 400° F. for certain cooking operations, and the legs 43 described above are provided to space the hot surface of the pan 70 from any support. The feet 43 have been illustrated as substantially identical with those disclosed in the above-mentioned Jepson patent. Each of the feet 43, as illustrated, is a multipart foot including a somewhat conically shaped insulating element 43a defining the portion of the foot engageable with the supporting surface. To reduce the heat transfer from the bottom of the vessel 44 and, specifically, from the pan 70 to the insulating members 43a of the legs or feet 43, each of the feet also includes a cup-shaped element 43b, preferably formed of a relatively poor conductor of heat, such as stainless steel or the like. One of these feet 43 is provided in each corner of the pan or in a comparable place if a circular pan is involved. Preferably, at the points on the pan 70 where the legs 43 are to be attached, circular deformations 70c are provided to receive therein the open end of the cup-shaped portions 43b of the feet 43. From FIG. 4 it will be apparent that the tube 78 preferably depends into one of the cup-shaped members 43a, thus not interfering in any way with the operation of the device.

For the purpose of firmly securing the legs 43 to the pan 70, a suitable nut, such as 79, is preferably brazed, welded or otherwise secured to the pan 70 at the center of the circular deformation 70c and a fastening means in the form of a screw 80 is adapted to extend through the elements 43a and 43b to secure the same position. The insulated support 43a preferably includes a recess 81 to receive the head of the fastening means 80 so that it will be substantially removed from the supporting surface. If desired, the fastening means 80 may also be formed of a material which is a poor conductor of heat. Preferably, no attempt is made to seal the junction between the pan 70 and the cup-shaped elements 43b of the legs 43, but, instead, the cup-shaped elements 43b are provided with a plurality of slits 82 so that if any water should enter therein upon immersion in liquid for cleaning purposes, the water can freely escape through the slits 82.

Any suitable means for securing the handle, such as 40, to the vessel may be employed. As illustrated best in FIGS. 2 and 3 of the drawings, a suitable tapped plate or nut 83 is suitably secured to a flanged cover 84 which, in turn, is brazed or otherwise secured to the side wall of the vessel 44. A suitable screw 85, extending through an opening 86 defined in the handle 40, engages the tapped opening in the support 83 and firmly secures the handle to the vessel. Preferably, the handle 40 is provided with a recess 40a so that the head of the fastening means 85 can be received therein and cannot interfere in any way.

To supply electrical energy to the heating element 45, it is customary to provide with such electrical device a so-called plug receptacle for the reception of a cooperating plug connector. As illustrated in the drawings, a plug receptacle 88 is provided which is secured by suitable fastening means 89 to the exterior of the vertical wall of the pan 70 adjacent the projection 70b, so as to enclose therein the portions of the three terminals 71, 72 and 73 extending outside the hermetically sealed chamber within pan member 70. As best shown in FIG. 6 of the drawings, the walls defining the plug receptacle 88 are provided on either side with a pair of openings 88a, the purpose of which will become apparent from the ensuing description.

From the above discussion, it will be apparent that there has been described a heating vessel with a built-in heating element and temperature sensing element which may be completely immersed in liquid for washing purposes. Moreover, the only electrical portions of the device which will be subjected to the washing liquid will be the portions of the terminals 71, 72 and 73 extending into the plug receptacle 88.

For the purpose of supplying electrical energy to the heating element 45 through the terminals 71 and 73, a conventional two-conductor power cord is required, as will be understood by those skilled in the art. It will be apparent, however, that to utilize the changes exhibited by the sensing element 50 as the temperature thereof varies an additional circuit is necessary. To this end, one of the conductors supplying the energy to the heating element 45 is employed as a common conductor for both circuits which comprises the terminal 73. To cooperate with the terminals 71 and 72, the power cord 26 is a three-conductor cord instead of a two-conductor cord.

To make electrical connection with the terminals 71, 72 and 73 extending into the plug receptacle 88 there is provided, in accordance with the present invention, an improved plug connector 90, best shown in FIGS. 6, 7, 8 and 9 of the drawings. As illustrated, this plug connector is preferably formed of two molded parts 90a and 90b clamped together by a suitable rivet 91 or other fastening means. Housed within the plug connector 90 are a plurality of spring biased contacts, specifically designated as 92, 93 and 94, for respectively engaging the contacts 71, 72 and 73. These spring biased contacts are each designated as being supported on a separate spring structure member shaped somewhat in the form of a sine wave. The contacts 92 and 94 which carry the main heating current are illustrated as being supported on a somewhat heavier conductor 95, best shown in FIG. 8 of the drawings. The contact 93 on the other hand is supported on a smaller, but similar, spring conductor 96. These spring conductors 95 and 96 bias the associated contacts 92, 93 and 94 in a direction to make good electrical connections with the respective terminals 71, 72 and 73 when the plug connector 90 is inserted into the receptacle 88. The spring conductors 95 and 96 are electrically connected with the appropriate conductors in power cord 26. To make sure that such connections are maintained, the plug connector 90 is preferably provided with a pair of latch members 97 for making latching engagement with the openings 88a in the plug receptacle 88, as clearly shown in FIG. 6 of the drawings. The latch members 97 are preferably disposed in suitable recesses, such as 99, defined in the connector 90. A suitable spring wire 100, provided for each latch member 97, biases it into latching position. Preferably, a pair of manually actuated members 101 extend outside the plug connector 90 for ready manual engagement by the operator to release the latches 97. These manually actuated members 101 have the configuration shown best in FIG. 9 of the drawings to permit ready assembly thereof before the housing parts 90a and 90b are secured together.

Figure 11:
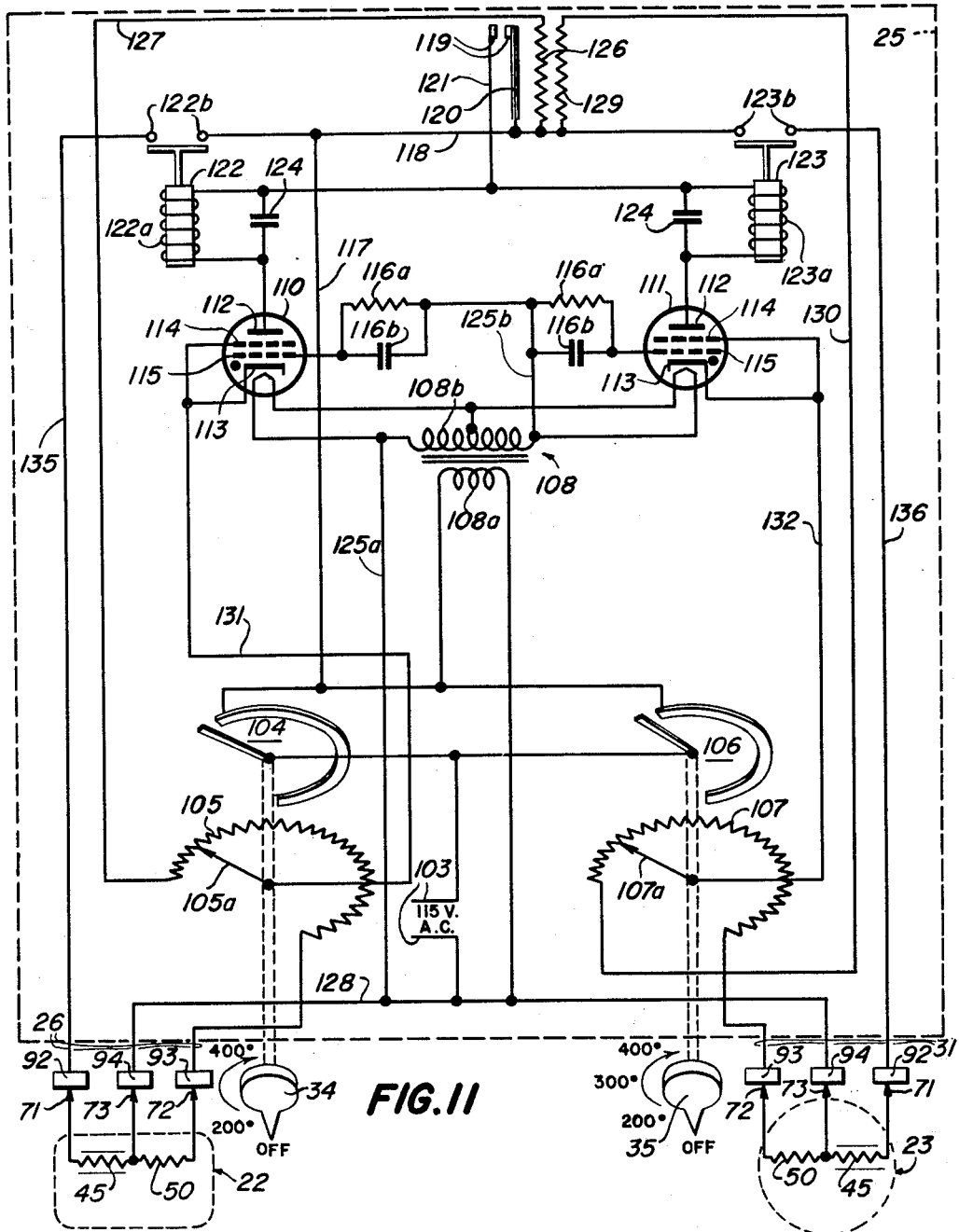
FIG. 11 is a schematic circuit diagram showing a control circuit of the present invention for controlling a plurality of cooking vessels which are remote from the temperature control unit therefor.

It will be apparent from the above description that some means must be provided to utilize the change in resistance with temperature of the sensing element 50 to control the supply of energy to the heating unit 45. Obviously, a satisfactory way would be to interrupt the circuit to the heating element 45 when the temperature of the vessel reached a predetermined selected value and to re-establish this circuit when the temperature dropped below such predetermined value. This can be accomplished by a suitable relay. Although there are available relays which can be operated directly from the small current change produced by the sensing element 50 with change in temperature without amplification thereof, it is preferred to use a less sensitive relay. For this reason, there is provided in the control unit 45 the necessary amplification means which may take various forms. One form is schematically shown in FIG. 11 of the drawings, wherein the corresponding parts are designated by the same reference numeral as in the previously described figures. Actually, it has been found that a simple dual control circuit can be provided to control two vessels independently, and such a dual control means is shown in FIG. 11 of the drawings. The circuit of FIG. 11 requires only a single filament transformer for two amplifiers and this can also serve as the source of bias voltage for these amplifiers.

In FIG. 11 the cooking unit 22 is illustrated with its heating element 45 and its sensing element 50 and its terminals 71, 72 and 73. These terminals happen to be arranged slightly differently in the schematic drawing of FIG. 11 than in the structural drawings of the device. The vessel 23 is also schematically illustrated in FIG. 11 and the heating element, sensing element and terminals are designated by the same reference numerals as in connection with the vessel 22. The control knob 34 is also illustrated for controlling the temperature of the vessel 22, while the control knob 35 is illustrated for controlling the temperature of the vessel 23. The control panel unit itself is designated by a dashed rectangle, to which is appended the reference numeral 25 to correspond to this reference numeral in FIG. 1 of the drawings. There is included in the control unit 25 a suitable source of power, designated as 103 and indicated as a conventional alternating current source of 115 volts. Associated with the control knob 34 is the switch 104 and a variable resistance 105. When the control knob 34 is in the off position, the switch 104 is open, and if the knob 34 is rotated slightly in a clockwise direction, as viewed in FIG. 11, the switch 104 closes and varying amounts of resistance 105 are rendered effective by a movable switch arm 105a actuated by control knob 34. Similarly, there is associated with the control knob 35 a similar switch 106 and a variable resistance 107. The control knob 35 actuates switch 106 and also actuates a movable switch arm 107a selectively to control the introduction of variable portions of resistance 107 into the circuit. The source 103 of electric power is illustrated as being connected through either one of the switches 104 or 106 to the primary winding 108a of a suitable filament transformer 108 whose secondary winding 108b is connected in the filament circuits of a pair of thyratron tubes or gas type electron discharge valves 110 and 111 in a conventional manner. These valves are each illustrated as having a plate 112, a cathode 113, a screen grid 114 and a control grid 115. An alternating control signal described hereinafter is supplied to each of the control electrodes 115 of the valves 110 and 111 through a coupling capacitor 116b across which is connected a grid leak resistor 116a.

For the purpose of supplying plate voltage to the electron discharge valves 110 and 111, the common terminal of the switches 104 and 106, which are connected in parallel to the source 103, is connected by a conductor 117, a conductor 118, the contacts 119 of a bimetallic control switch including a bimetal 120, and conductor 121 to the plate circuit of each of the valves 110 and 111. To control the heating element 45 of cooking vessel 22, the plate circuit of the electron discharge valve 110 includes the winding 122a of a relay 122 having normally open contacts 122b. To control the heating element 45 of cooking vessel 23, the plate circuit of electron discharge valve 111 includes the winding 123a of a relay 123 having normally open contacts 123b. The winding 122a is connected in series between the conductor 121 and the plate 112 of thyratron 111. Similarly, the winding 123a of relay 123 is connected between the conductor 121 and the plate 112 of thyratron 111. Since an alternating current plate voltage is employed preferably, suitable capacitors 124 are connected, one across each of the windings of the respective relays 122 and 123, thus preventing chattering of these relays upon half-cycle conduction of the valves 110 and 111.

From the above description, it will be apparent that plate voltage may be applied to the valves 110 and 111 when either one or both of the switches 104 or 106 is closed and, in addition, when the contacts 119 of the switch controlled by bimetal 120 are closed. The purpose of the bimetallic switch 119 is to prevent the application of plate voltage until the filaments of the valves 110 and 111 have had sufficient time to warm up. To this end, a circuit is provided for energizing a resistor 126 adjacent the bimetallic element 120 whenever the switch 104 is closed. The heat produced by this resistor 126, after a predetermined delay, will cause bimetallic element 120 to close contacts 119, thus applying plate power.

One terminal of the resistor 126 is connected to the conductor 118, which, as was pointed out above, is connected to one side of the source 103 whenever either of the switches 104 or 106 is closed. The other terminal of resistor 126 is connected through a conductor 127, resistor 105, outlet terminal 93, terminal 72 of vessel 23, sensing element 50 of the vessel 22, terminal 73 of vessel 22, outlet terminal 94 and conductor 128 to the other side of the alternating current source 103. If the vessel 22 is not connected in the circuit, but only the vessel 23 is connected, then the heating of bimetal 120 is controlled by a resistor 129, preferably identical with the resistor 126. One terminal of resistor 129 is also connected to the conductor 118. The other terminal of resistor 129 is connected through a conductor 130, the resistor 107, outlet terminal 93, terminal 72 of the cooking vessel 23, sensing element 50 of vessel 23, terminal 73 of cooking vessel 23, outlet terminal 94 of the associated outlet, and conductor 128 to the other side of the alternating current source 103. As will become apparent from the ensuing description, the resistors 126 and 129 perform another function in addition to controlling the bimetallic element 120.

Alternating potential displaced in phase by one hundred and eighty degrees from the plate voltage is applied to the control electrodes 115 of the valves 110 and 111 from the secondary winding 108b of transformer 108, the primary winding 108a of which is energized from the source 103.

For the purpose of controlling or adjusting the temperature setting of the cooking vessel 22, the movable switch arm 105a, which is adapted to vary the effective resistance of the resistor 105, is connected by a conductor 131 to the cathode 113 of valve 110. The screen grid 114 of this valve is connected to the cathode 113 in the conventional manner. Similarly, the movable arm 107a cooperating with the resistor 107 is connected by a conductor 132 with the cathode 113 of electron discharge valve 111.

An examination of the circuit described thus far will show that the sensing element 50 of the vessel 22 is effectively connected in a voltage divider circuit across the power source 103, which voltage divider circuit includes the sensing element 50, the resistor 105 and the resistor 126. In the case of the vessel 23, a similar voltage divider circuit is provided across source 103 including the sensing element 50 of the vessel 23, the resistor 107 and the resistor 129. By selectively adjusting the control knobs 34 and 35 the effective bias on valves 110 and 111 can be varied. The thyratrons 110 and 111 are thus controlled by directly changing the cathode voltage which varies the control grid to cathode voltage, thereby to control the time during the alternating current cycle when the thyratrons 110 and 111 are conductive.

Figure 12A:
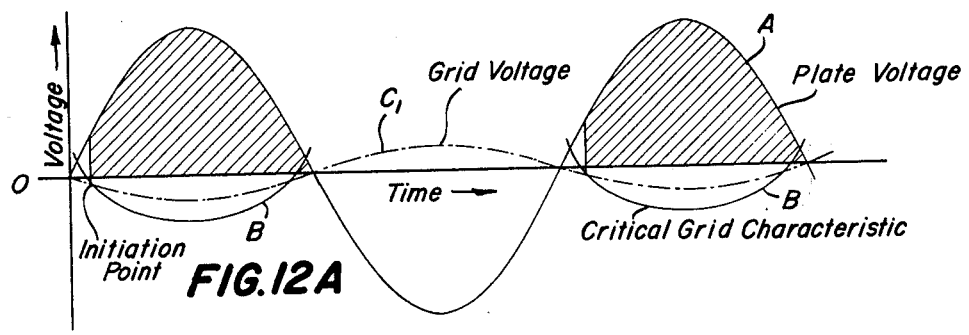
FIGS. 12A and 12B are curve diagrams to aid in understanding the operation of the control circuit of FIG. 11.
Figure 12B:
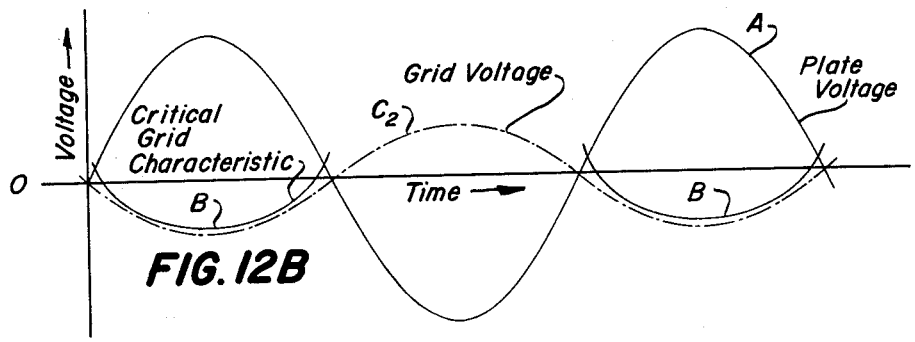

The operation of the control circuit of FIG. 11 can best be understood by reference to the curve diagrams of FIGS. 12A and 12B. The alternating current plate voltage appearing at the plate of the thyraton 110 is designated in both FIGS. 12A and 12B by the sinusoidal curve A. The critical grid characteristic of the thyratron 110 is designated in each case by the curves B. It will be apparent then, that, if the grid-to-cathode voltage on the control electrode 115 is represented by the curve $C_1$ of FIG. 12A, the thyratron 110 will be rendered conductive whenever the curve $C_1$ moves above the critical grid characteristic curve B and will remain conductive during the remainder of that half-cycle until the plate voltage approaches zero. The shaded area under the curve thus indicates the conductive periods of the thyratron 110. If, now, the grid-to-cathode voltage should be changed to assume the value represented by the curve $C_2$ in FIG. 12B of the drawings, it will be apparent that the thyratron 110 will not be rendered conductive during any portion of the plate voltage cycle. With this arrangement, then, the thyratron 110 and, similarly, the thyratron 111 are either on or off, depending upon the grid-to-cathode voltage. It will be clear that when the vessel 22 is cold, the resistance of its sensing elements 50 will be at a minimum, and the voltage applied to the cathode 113 through conductor 131 will be at a minimum for any particular setting of the movable arm 105a of variable resistor 105. Under these conditions, the thyratron 110 will be rendered conductive for most of the positive portions of the alternating current plate voltage and the relay 122 will be energized to close its contacts 122b. The same applies for the other portion of the dual control of the present invention for controlling the vessel 23.

To complete the heating circuit for the vessel 22 the contacts 122b of relay 122 are connected between conductors 118 and 135, the latter being connected to heating element 45 through contacts 71 and 92. Conductor 118 is connected to one side of source 103, while heating element 45 of vessel 22 is connected to the other side of source 103 through contacts 73 and 94 and conductor 128. An identical circuit is provided for element 45 of the vessel 23, which extends from the conductor 118 through contacts 123b of relay 123, a conductor 136, the contacts 92 and 71 associated with the vessel 23, the heating element 45 of the vessel 23, the terminal contacts 73 and 94 associated with the vessel 23 and to the conductor 128. Due to the positive temperature coefficient of the sensing elements 50 in either of the vessels 22 or 23, when the vessel heats up the resistance of the sensing elements 50 increases, thus increasing the amplitude of the sinusoidal wave of voltage applied to the cathodes 113 of the associated thyratrons. Thus, when a predetermined selected temperature has been attained in the vessels 22 or 23, as determined by the temperature setting of the control knobs 34 or 35, thyratrons 110 or 111 will be rendered non-conductive, with the result that the associated relays 122 or 123 are deenergized to open the heating circuit.

In view of the detailed description included above, the operation of the remotely controlled cooking vessel of the present invention will readily be understood by those skilled in the art. It should be understood that various circuit arrangements and various circuit constants may be employed in connection with the arrangement of the present invention disclosed in FIG. 11 of the drawings. In order to illustrate the relative magnitudes of the elements of a typical circuit arrangement which has been found to satisfactorily embody the present invention, the following approximate values of such elements, together with other pertinent information, are given for a particular device. It should be understood that these values are given by way of example only, and are not by way of limitation.

Electron discharge valves 110
 and 111 _____ RCA 5696.
Resistor 126 _____ 7,000 ohms
Resistor 129 _____ do.
Variable resistor 105 _____ 500 ohms.
Variable resistor 107 _____ do.
Resistors 116a _____ 1,000,000 ohms.
Capacitors 116b _____ 0.1 microfarad.
Sensing elements 50 _____ 500 ohms (when cold).
Heating elements 45 _____ 1,100 watts.

In a device built in accordance with the present invention, embodying the circuit of FIG. 11 when the control knob was set to maintain about 400° temperature of the associated cooking vessel under no-load conditions, the control relay would cycle about once during each two-minute interval. It will be appreciated that this frequency of operation could be altered by changing some of the circuit constants.

One desirable feature of using a sensing element having a positive temperature coefficient as described above is that in the event an open circuit condition should occur or dirty or high resistance contacts are included in the control circuit, the temperature of the vessel, being controlled, will be maintained at a lower temperature than that desired. This is a sort of "fail-safe" feature which is desirable.

There are, of course, available on the market today many materials which have a negative temperature coefficient, one of which is the thermistor generally comprising non-metallic disks, rods, or beads (commonly oxides or other semiconductors) whose resistance decreases with increase in temperature thereof. Such thermistors could be employed as the sensing elements in remotely controlled cooking vessels of the type described above. A much greater change in resistance with change in temperature occurs in such thermistors compared with the metal sensing elements, such as 50, described above. There is one disadvantage, however, in that a poor contact or an open circuit could result in the vessel being maintained at a higher temperature than the setting selected.

In view of the detailed description included above, it will be understood that such thermistors would be located in a manner similar to the location of the sensing element 50. Due to the substantial change in resistance with temperature, they can be connected directly in series with a magnetic or thermal relay which would be located in the control panel unit 25. The temperature control knob, such as 34, would control a variable resistance in the circuit or, perhaps, control a biasing force on the relay armature, or even the position of a movable contact point if a thermal relay is used. Such an arrangement would be subject to voltage variations and means would be required to compensate for such voltage variations.

It should also be appreciated that, instead of a separate sensing element 50 for each of the vessels, the heating element of the vessel could be employed both as a heating element and as the temperature sensing element. This would result in a simplified construction, since only a two-conductor power cord would be necessary. It would thus eliminate a separate sensing element, as well as the third terminal and conductor described above. There is, however, a problem raised with such an arrangement, since the temperature of the heating element is not only limited to the surface temperature of the vessel, but will also vary with voltage and load conditions. Thus, such a heating element could, conceivably, be at a very high temperature at the same instant that the cooking vessel is at a very low temperature, if, for example, a sudden increase in voltage has just occurred. However, if load and voltage conditions are properly compensated for, such an arrangement could be satisfactorily employed and there is described hereinafter one such arrangement embodying the present invention.

Instead of using the heating element as the sensing device, the refractory material 45b which insulates the heating element can be used for this purpose. Thus, instead of using fused magnesium oxide as mentioned above, a small quantity such as about five percent of copper oxide may be mixed into the magnesium oxide thus providing a leakage resistor whose resistance varies with changes in temperature. This arrangement would require less compensation and would be more closely responsive to the temperature of the vessel being controlled.

Instead of using as a temperature sensing element a device which converts heat to an electrical characteristic, such as an element whose resistance changes with temperature, it is possible to use as a sensing element a device which converts heat directly to mechanical energy; an example of which is a bimetallic element. One such arrangement is schematically disclosed in FIG. 13 of the drawings. As there illustrated, a cooking vessel generally designated at 140 is provided which has a built-in electric heating element designated at 141. A remote control unit generally designated at 142 is connected with the vessel 140 through a three-conductor power cord 143, similar to the power cord 26 described above. The cooking vessel 140 preferably embodies the same hermetically sealed heating element 141 described in connection with the previous embodiment. In addition, a temperature sensing element comprising thermostatic means 144 is provided which, as illustrated, consists of a bimetallic blade or element having one end fixed as indicated at 145 in good heat conducting relationship with the bottom of the vessel 140. The low expansion side of the bimetallic element 144 is illustrated as being adjacent the bottom of the vessel 141 so that upon heating the element 144 deflects upwardly as viewed in the drawings. A resistor 146 associated with the vessel 140 for heating bimetallic element 144 is connected to a stationary contact 147a of a normally closed switch 147 having a movable contact 147b mounted on the free end of the bimetal 144. The heating element 141, bi-metallic element 144, resistor 146, switch 147 and the electric circuits terminating in a plug receptacle generally designated at 149, preferably identical with the plug receptacle 88 mentioned above, are hermetically sealed so that the vessel 140 may be completely immersed in liquid for washing purposes.

Figure 13:
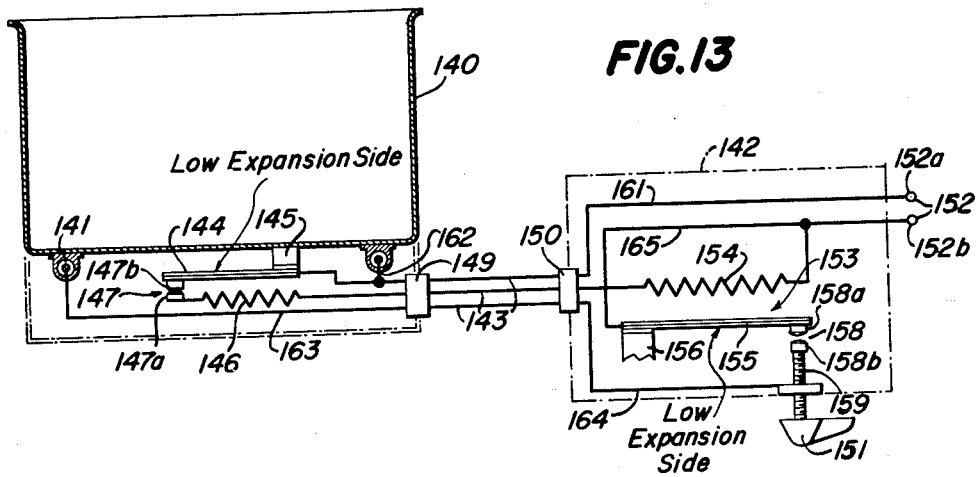
FIG. 13 is a somewhat schematic diagram similar to FIG. 11 illustrating a modification of the present invention.

The control unit 142 of FIG. 13, which would correspond to the panel unit 25 in FIGS. 1 and 11 of the drawings, includes a power outlet schematically designated at 150 and a manual control knob 151 for selecting any desired temperature of the cooking vessel 140. Obviously, electric energy from a source of power, designated as 152, is supplied to the control unit 142, the terminals of this source being designated as 152a and 152b, respectively. Instead of an electromagnetic type relay as described in connection with FIG. 11 of the drawings a thermal type relay is provided to control the main heating circuit for the vessel 140. Thus, control unit 142 further includes a main thermal relay 153 comprising a resistor 154 and an associated bimetallic element 155 which is mounted in cantilever fashion, having one end secured to a suitable support as indicated at 156. The free end of the bimetallic element 155 is adapted to control a normally open switch 158 including a movable contact 158a supported from the free end of the bimetallic element and a so-called stationary contact 158b, supported on an adjustable member 159, controlled by knob 151.

To control the temperature of vessel 140 from the remotely located control unit 142, the circuit elements described above included in vessel 140 and control unit 142 are connected into an electrical circuit which effectively has two branches. As illustrated in the drawings, the main energization circuit for the heating element 141 of the vessel 140 extends from the terminal 152a of the source 152 through a conductor 161, through the power cord 143 and through a conductor 162 directly to one terminal of the heating element 141. The other terminal of the heating element 141 is connected by conductor 163, the power cord 143, a conductor 164, the switch 158, bimetallic element 155 and a conductor 165 to the terminal 152b. In parallel with but a portion of this main circuit is a circuit branch including bimetallic element 144, the switch 147 controlled thereby and the resistors 146 and 154 connected in series. Preferably, the bimetal 144 is designed so as to open the switch 147 at about the highest temperature at which the vessel 140 is intended to operate, which might be of the order of 400° F. It will be appreciated that when the vessel 140 is cold all of the thermal energy for opening switch 147 must be supplied from the resistance 146. However, as the vessel 140 is raised in temperature, part of the heat for actuating switch 147 comes from the vessel itself and part from the resistance element 146.

The operation of the arrangement in FIG. 13 can best be understood by first considering the conditions that obtain when the vessel 140 is cold and power cord 143 is connected between the control element 142 of the vessel 140. Since the switch 158 is open, the only current flow will be through the branch circuit, comprising resistor 154, resistor 146 and switch 147. The heat supplied by resistor 154 very quickly causes the bimetallic element 155 of thermal relay 153 to deflect and close the switch 158. When this happens the heating element 141 is energized and the vessel 140 will rise in temperature. Preferably, the resistor 146 is designed to produce insufficient energy by itself to open the switch 147. As soon as the heat from the vessel 140, which now begins to increase in temperature, when supplemented by that produced by the resistor 146, is sufficient to open switch 147, resistor 154 becomes de-energized, with the result that switch 158 is opened by action of thermal relay 153, thus terminating heating of the vessel 140. The vessel 140, of course, cools down and bimetallic element 144 again recloses the switch 147, which results in the closing of the switch 158 of the thermal relay 153, thus providing an on-off cycle of the vessel to give accurate temperature control. The position of the so-called stationary contact 158b, which may be adjusted by the control knob 151, gives any desired selected temperature of the vessel 140 within the heating range thereof.

It will be appreciated that if the knob 151 is set to produce a relatively high temperature in the vessel 140, most of the heat necessary to operate the bimetallic element 144 must come from the vessel itself, rather than from the resistor 146. Under these conditions, the contact 158b must be moved toward the movable contact 158a so that a relatively small movement of the bimetal 155 will cause opening and closing of the main heating circuit. The arrangement disclosed in FIG. 13 is very satisfactory, since it is completely independent of the cooking load or the supply voltage. Moreover, the switch contacts for the switch 147 are required to carry only a very small current, measured in milliamperes, and the whole device associated with the vessel 140 can readily be sealed therein, as in connection with the arrangement disclosed in FIG. 2 of the drawings.

Should it be desired to provide a control arrangement where only a two-wire power cord is employed, as was mentioned above, the arrangement of FIG. 14 can be used, which is provided with means for compensatnig for voltage and load changes. As in FIG. 13, a thermal relay is employed in the control unit which is remotely disposed with respect to the cooking vessel the temperature of which is being controlled. Returning now to FIG. 14, there is illustrated a cooking vessel designated as 170 having associated in intimate heat exchange relationship therewith a heating element 171. It will be understood that this heating element will be hermetically sealed and only a pair of terminals, designated as 172, will extend outside the sealed portion thereof. Thus, the device can readily be immersed in liquid for cleaning purposes. The rest of the apparatus includes the remotely disposed control panel unit designated at 174 which must be connected to the vessel 170 with a conventional power cord 175 having but two conductors. To serve the dual function of both a heating element and a temperature sensing element, the heating element 171 should, preferably, be formed of a nickel alloy so as preferably to have a high positive temperature-resistance characteristic. The control panel unit 174, like the panel unit 25, described in connection with an earlier embodiment, has projecting therefrom a manual control knob 176 and includes a power outlet designated at 177 for receiving the plug connector 175a of power cord 175.

As in the preceding embodiment, a source 152 of alternating current power is supplied to the panel unit 174, which might generally be designated as a control unit. The only reason for referring to it as a panel unit is because it will be mounted, preferably, in some kind of a wall panel in a kitchen or the like, somewhat as described in FIG. 1 of the drawings. Housed within the control unit 174 are a main thermal relay 178 and a compensating bimetallic element 179. The main thermal relay 178 includes a bimetallic element 180 which is rigidly mounted at one end to an insulating support indicated at 181. The free end of element 180 supports one contact 182a of a normally closed switch 182. Bimetallic element 180 of thermal relay 178 has its high expansion side on the side opposite contact 182a so that when the temperature thereof decreases it tends to open switch 182. The other contact of switch 180, designated as 182b, is supported on one end of compensating bimeatllic element 179 which is pivotally mounted at the other end as indicated at 179a. The high expansion side of bimetallic element 179 is on the side adjacent contact 182b so with heating compensating bimetallic element 179 tends to open switch 182. Thus, elements 179 and 180 function oppositely with heating or cooling. The control knob 176 is connected to bimetallic element 179 adjacent pivot 179a selectively to control the position of contact 182b.

To control the compensating bimetallic element the control unit 174 also includes a compensating resistor 183 disposed adjacent the element 179 and an associated parabolic reflector 184 for reflecting radiant energy from the heating element 183 onto the bimetallic element 179. The main thermal relay 178 further includes a main resistor 185 disposed adjacent the main bimetallic element 180 and a parabolic reflector 186 which tends to direct the radiant energy from the heating element 185 toward the main bimetallic element 180. Preferably, the resistors 183 and 185 are located at the focal points of the associated parabolic reflectors 184 and 186, respectively. It should be understood that the resistors 183 and 185 could be wound around the associated bimetallic elements 179 and 180, respectively, in which case the reflectors 184 and 186 are not necessary.

For the purpose of accurately and selectively controlling the heating of vessel 170 from remote control unit 174, the circuit elements described above are electrically interconnected. The circuit for supplying current to the heating element 171 starts from one terminal 152a of the source 152 through a conductor 188 and the power cord 175 to one terminal of the heating element 171. This circuit is completed from the other terminal of the heating element 171 through the power cord 175, a conductor 189, the resistor 185 and the bimetallic element 180 of thermal relay 178, switch 182, compensating bimetallic element 179 and a conductor 190 to the other terminal 152b of the power source 152. A branch compensating circuit is also included which is connected in parallel with the portion of the above-described power circuit comprising the resistor 185 and the heating element 171. This branch circuit, beginning with the conductor 188, includes the compensating resistor 183, and a conductor 192 connected directly to the bimetallic element 180 of thermal relay 178. It will be apparent that the current flowing in resistor 185 when switch 182 is closed will be effected by the change in resistance with heating of heating element 171 while the current in compensation resistor 183 will not be so effected.

Figure 14:
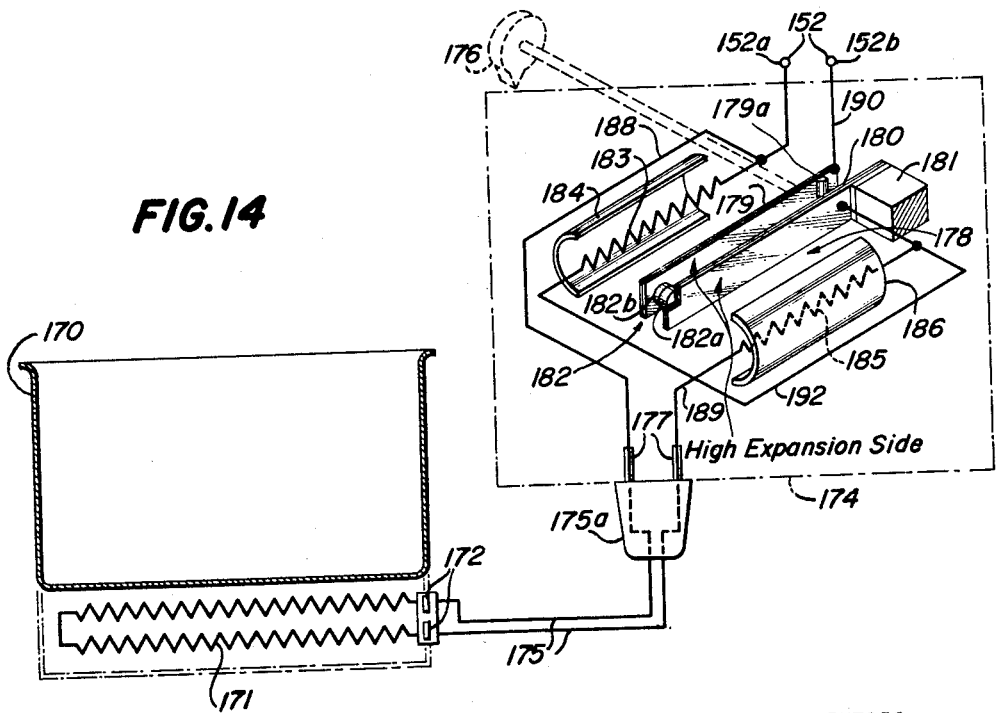
FIG. 14 is a view similar to FIG. 13, illustrating still another modification of the present invention.

The operation of the arrangement disclosed in FIG. 14 can best be understood by considering several cycles of operation thereof. Assuming, for example, that the vessel 170 is cold and has just been connected by power cord 175 to the control panel unit 174 and the knob 176 has been adjusted to select some desired temperature for vessel 170, then under these conditions current will flow through both branches of the circuit described above to the heating element 171 because switch 182 is closed. While the temperature of element 171 is increasing, the heating elements 183 and 185 are also heating their associated bimetallic elements 179 and 180, respectively. If the resistance of the element 171 did not change so that the current through the two branches remained at the same relative levels, the switch 182 would remain closed, since although the bimetallic element 179 upon heating would tend to open the switch 182, the bimetallic element 180 with heating tends to close the switch. It will be understood, however, that as the temperature of heating element 171 increases, its resistance increases, so that the current through the main branch of the control circuit which includes the resistor 185 of the thermal relay 178 will decrease, whereupon bimetallic element 180 of this relay will be heated less than it previously was. However, the current in resistor 183 will not change. Consequently, thermal relay 178 will open the switch 182. When this occurs, of course, the circuit is interrupted in both branches and the temperature of the heating element 171 drops as the vessel cools, thus also decreasing its resistance. Moreover, since no current now flows in either resistors 183 or 185, the temperature of bimetallic elements 179 and 180 also drops, with the result that the switch 182 is reclosed, again initiating the heating cycle. Thus, by cyclic operation of thermal relay 178, resulting in opening and closing of switch 182, not only is there a cyclic operation of the heating element 171 and the main control resistor 185 connected in series therewith, but there is also a cyclic operation of the branch circuit, including the compensating resistor 183.

It will be apparent that the purpose of the branch circuit and, particularly, the resistor 183 and associated bimetallic element 179, is to compensate for the varying effect of line voltage, as well as the effect of varying load conditions. When the line voltage increases, higher currents will flow through both branches, causing higher rates of heat generation in both resistors 183 and 185, thus effecting a greater deflection of the main bimetallic element 180 in a switch closing direction and a greater deflection of compensating element 179 in a switch opening direction. Since, under these conditions, both elements deflect equal amounts in the same direction, the switch 182 will remain closed and, consequently, the circuit is unaffected by voltage changes of the source. If the voltage decreases the same thing happens in reverse.

The compensating resistor 183 and bimetal 179 also compensate for load changes, which will result in greater or less dissipation of heat produced by the heating element 171. This can best be understood by considering, for example, a condition where the vessel 170 is intended to be maintained at a constant temperature under only a partial cooking load, say a twenty percent load. Suppose that to maintain a selected desired constant temperature of the vessel 170 under this condition a mean temperature differential between the heating element 171 and the interior surface of the vessel 170 would be 20° F. The only way this mean temperature differential can be maintained is by having the bimetallic elements 179 and 180 operate to keep current flowing twenty percent of the time. Now, if the load were suddenly increased to ninety percent of the maximum load and the temperature setting of the knob 176 remains unchanged, to maintain the same temperature in vessel 170 the temperature differential could, instead of being 20° F., be 90° F. This means that the temperature of the element 171 will be 70° F. higher than it was before. Such increase in temperature raises the resistance of the element 171, thus decreasing the mean watt input of resistor 185 which, in turn, causes the bimetallic element 180 to deflect in a manner to tend to open the switch 182. This motion of bimetallic elment 180 would soon break the circuit at the contacts 182a and 182b of switch were it not for the action of the compensating bimetal 179 and the resistor 183. Resistor 183 is, under these conditions, passing current ninety percent of the time, so that it raises its average temperature, which, in turn, increases its heat output to cause bimetal 179 to move in a direction to close switch 182. Thus, compensation for the effect of the varying loads is provided in a simple manner. It will be clear, therefore, that the arrangement of FIG. 14 maintains a uniform surface temperature at the cooking surface of the vessel 170, compensating for the effect of both variable cooking loads and variable input voltage. Moreover, this is accomplished with only a two-conductor power cord between the control panel 174 and vessel 170.

Figure 15:
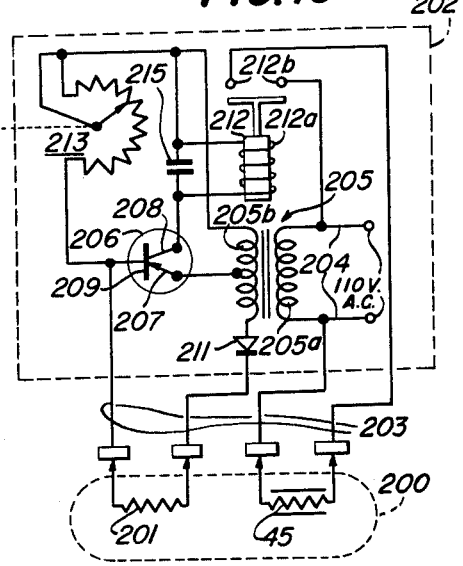
FIG. 15 is a schematic view similar to FIG. 11 illustrating still another modification of the present invention.

It will be understood that instead of the electron discharge valve amplifiers described in connection with the arrangement shown in FIG. 11 of the drawings, a transistor amplifier circuit might be employed which eliminates any filament current problem and the shortened life occasioned by the burning out of such filaments. In FIG. 15 of the drawings, there is illustrated diagrammatically a control arrangement similar to that shown in FIG. 11 of the drawings employing a transistor amplifier. As there illustrated, a cooking vessel 200 is provided with a built-in electric heating element similar to the heating element 45 described above and, in addition, has associated therewith a sensing element 201 which could comprise a resistance material having either a positive or a negative resistance temperature coefficient. Such a sensing element might comprise a thermistor or other similar device described above. The vessel 200 should be capable of being immersed in liquid for washing purposes. Consequently, the elements 201 and 45 should be hermetically sealed with respect to the vessel 200 in the manner of the previously described embodiments. In the embodiment illustrated in FIG. 15 the resistor 201 is one having a negative resistance-temperature characteristic.

For the purpose of selectively controlling from a remote point the temperature of the vessel 200, there is provided a control unit generally designated at 202 which is connected to the vessel 200 by a four-conductor power cord designated at 203. Obviously, a common conductor for both elements as in FIG. 11 could be employed, thus permitting use of a three-conductor power cord. The control unit 202 further includes a source of alternating current which is supplied to a transformer 205 having a primary winding 205a and a secondary winding 205b. Also included in the control unit 202 in accordance with the present invention is a current multiplication transistor 206. For descriptive purposes, the transistor 206 may be of the type which is described in an article written by R. M. Ryder and R. J. Kircher, entitled "Some Circuit Aspects of the Transistor," appearing in the Bell System Technical Journal for July 1949. As illustrated, the transistor 206 has three electrodes, i.e., an emitter 207, a collector 208 and a base 209. The emitter 207 of the transistor 206 is illustrated as being connected to a midpoint tap on the secondary winding 205b of the transformer 205. One terminal of this secondary winding 205b is connected through a rectifier 211 with one terminal of the sensing element 201. The other terminal of the sensing element 201 is connected to the base 209.

In order to control the supply of electrical energy to the heating element 45, there is provided in control unit 202 a relay 212 having a winding 212a and a normally open set of contacts 212b. The winding 212a of the relay 212 has one terminal thereof connected to the collector 208, while the other terminal thereof is connected to the base 209 through a variable resistor 213. The variable resistor 213 may be varied by the adjustment of a manual control knob 214. Preferably, a capacitor 215 is connected across the winding 212a of the relay 212 so that it will not chatter or otherwise improperly operate when supplied with a pulsating direct current such as would be the case with an alternating current rectified with only a half wave rectifier. The terminal of the secondary winding 205b of the transformer 205 not connected to the rectifier 211 is connected to the terminal common to resistor 213 and winding 212a of relay 212. So that relay 212 may control heating element 45, the source 204 of alternating current voltage is directly connected to the heating element 45 of the cooking vessel 200 through the contacts 212b of the relay 212.

From the above description it will be noted that the sensing element 201 and the variable resistor 213 effectively provide a voltage divider circuit, the common terminal of which is connected to the base 209 of the transistor 206. It will, moreover, be apparent that as the resistance of the sensing element 201 changes, the effective base-to-emitter voltage decreases. A decrease in the base to emitter voltage causes a substantial decrease in the collector current, or, in other words, the current that flows through the winding 212a of relay 212. As a result, depending upon the setting of the knob 214, the relay 212 will interrupt the circuit when a predetermined selected temperature of the vessel has been obtained.

The control unit of FIG. 15 has an important feature in that it is substantially unaffected by line voltage variations. This is by virtue of the bridge type arrangement, since, regardless of the voltage of source 204, the voltage of the center tap of the secondary winding 205b will be essentially the same as the common terminal of sensing element 201 and resistor 213, differing only by the very small voltage drop across the transistor 206. Thus, there is almost a null condition at the operating point of relay 212.

In order to illustrate the relative magnitudes of the elements of FIG. 15 for a typical circuit arrangement which was found to satisfactorily embody the present invention, the following approximate values of such elements, together with other pertinent information, are given for a particular device. It should be understood that these values are given by way of example only and are not by way of limitation.

Transistor 206_____ CK 721.
Sensing element 201_____ 11,000 ohms (when cold).
Variable resistor 213_____ 15,000 ohms.
Heating element 45_____ 1,100 watts.

In view of the detailed description included above, the operation of the remotely controlled cooking vessel of FIG. 15 will readily be understood by those skilled in the art. The operator manually adjusts the knob 214 to any selected temperature, and the transistor 206 permits the relay 212 to be energized when the temperature of the vessel 200, as evidenced by the sensing element 201, is below the selected temperature. As soon as the selected temperature is reached, the base-to-emitter voltage will have decreased sufficiently that the resultant decrease in current flow in the collector current will permit the relay 212 to open contacts 212b. Consequently, with this arrangement the heating element 45 will be cycled on and off to maintain the desired temperature. It will be appreciated that the sensing element 201 should be disposed in intimate heat exchange relationship with the vessel 200 in the manner, for example, of the arrangement described in connection with FIG. 11. The control arrangement of FIG. 15 has a substantial advantage in that a very small space is required for the transistor amplifier circuit and, since no filament current is involved, there is no problem of heat dissipation.

Figure 16:
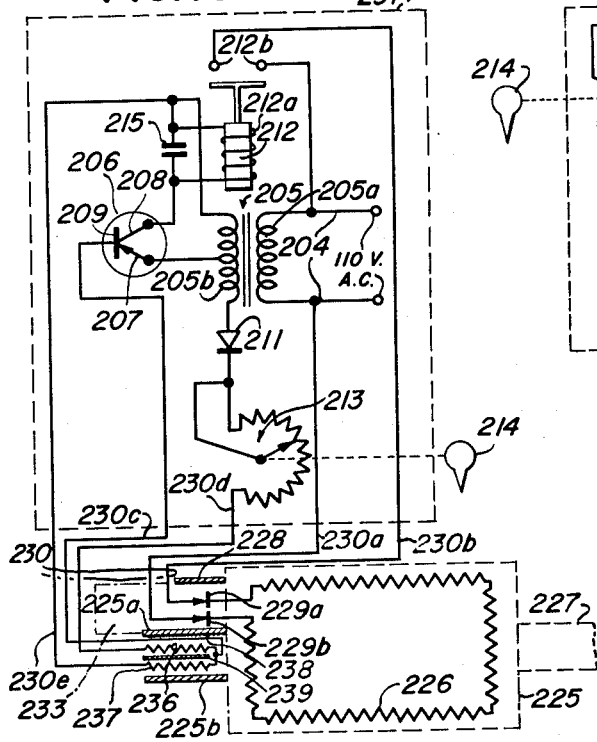
FIG. 16 is a view similar to FIG. 15 illustrating still another modification of the present invention.

In the arrangement of FIG. 15, it is necessary for the sensing element to be in intimate heat exchange relationship with the vessel. It is possible, however, to provide a sensing element which is not in intimate heat exchange relationship with the vessel being controlled but which is responsive to radiant energy emitted from the vessel. Such an arrangement requires compensation for ambient temperature, but otherwise can operate very satisfactorily and eliminates the requirements of a sensing element hermetically sealed within the unit. For example, the sensing element could be located within the plug connector of the power cord and a heat lug of copper or other good heat conducting material could extend from the vessel adjacent the power cord so as to heat the sensing element with energy radiated from said lug. The plug connector in this case would also require a compensating element to compensate for ambient temperature in this connector. In FIG. 16 of the drawings, there is illustrated an arrangement embodying both a temperature sensing element and a compensating element so that these elements could be mounted, for example, in the plug connector of the vessel.

Referring now to this FIG. 16 of the drawings, there is schematically illustrated a cooking vessel 225 having disposed in intimate heat exchange relationship therewith a sealed electrical element 226. The vessel is provided with a handle 227 and a plug receptacle 228 into which the terminals 229a and 229b of the heating element 226 extend. A five-conductor power cord 230 is illustrated as interconnecting the vessel 225 with a control unit 231 which may be very similar to the control unit 202 described above, and, in fact, the corresponding elements therein are designated by the same reference numerals.

As was mentioned above, the five-conductor power cord 230 terminates in a special plug connector 233. This plug connector 233 includes the conventional terminals for the individual conductors 230a and 230b which lead to the source 204 and supply energy to the heating element 226. In addition, however, the plug connector 233 includes a temperature sensing element 236 which, preferably, is an element having a negative resistance-temperature coefficient similar to the element 201 of FIG. 15 of the drawings. However, instead of being in intimate heat exchange relationship with the vessel 225, the sensing element 236 is mounted in the plug connector in spaced relationship from a heat lug 225a extending from the vessel 225. Preferably, the surface of the lug 225a adjacent the sensing element 236 is blackened as indicated at 238 to insure maximum heat emission to the sensing element. In this way the sensing element 236 can be heated by radiation emitted from the heat lug 225a and will be responsive to the temperature of the heat lug 225a and, consequently, also responsive to the temperature of the vessel 225 except for the effect of ambient temperature changes in the plug 233. To compensate for ambient temperature changes therein, there is also provided in plug connector 233, but positioned in a manner so as not to be affected by anything except the ambient temperature, a compensating element 237, which compensating element 237, preferably, also has a negative resistance-temperature coefficient. As illustrated, a suitable shield 239, such as an aluminum shield or the like, is interposed between the sensing element 236 and the compensating element 237. Furthermore, the portion 225b of the plug receptacle adjacent compensating element 237 is preferably provided with a shiny surface so as to reduce any radiation therefrom. The sensing element 236 and the compensating element 237 are illustrated as having a common terminal which is connected by conductor 230c of power cord 230 to the base 209 of transistor 206. The other terminal of the sensing element 236 is connected by conductor 230d of power cord 230 to the emitter element 207 of transistor 206 through the variable resistor 213, rectifier 211, and a portion of secondary winding 205b of transformer 205. The other terminal of the compensating element 237 is connected by conductor 230e of power cord 230 to the collector element 208 of transistor 206 through the winding 212a of relay 212. The arrangement of FIG. 16 operates in substantially the same manner as the arrangement of FIG. 15 described above except that the compensating element 237 is included in the voltage divider circuit and will modify the effect of the sensing element 236 in dependence upon the ambient temperature conditions in the plug connector 233.

In order to illustrate the relative magnitudes of the elements of a typical circuit arrangement which has been found to satisfactorily embody the present invention, as illustrated in FIG. 16, the following approximate values of such elements, together with other pertinent information, are given for a particular device. It should be understood that these values are given by way of example only and are not by way of limitation.

Transistor 206 _____ CK 721.
Sensing element 236 _____ 11,000 ohms (when cold).
Compensating element 237__ Do.
Variable resistor 213 _____ 15,000 ohms.

From the above description it will be apparent that various types of sensing elements have been employed, some of which are designed to vary an electrical characteristic thereof with temperature and others of which are designed to produce mechanical movement of different magnitudes in response to temperature. Actually, it may be desirable to use a sensing element that utilizes the Curie effect of ferromagnetic materials. For example, an electromagnetic relay could be employed in which, due to the Curie effect, a variation in the magnetic pull of the armature of the electromagnetic relay is utilized. It should also be understood that, instead of utilizing the variations in resistance due to temperature changes, the variation in inductance of a coil due to temperature changes might be employed.

From the above description it will be apparent there have been described several modifications of an improved cooking vessel which has a built-in electrical heating unit completely sealed therein so the vessel may be immersed in liquid for washing purposes. Moreover, accurate temperature control of such vessels may be obtained at all times from a control unit remotely located with respect to the vessel so that the control unit need not be embodied in the cooking vessel. The important criterion is that the vessel be completely immersible in liquid for washing purposes as set forth above. The term "remote from said vessel" when used in this application to describe the location of the control unit or portions thereof relative to the vessel is intended to mean separate or separable from the vessel.

While there have been illustrated and described several embodiments of the present invention, it will be obvious to those skilled in the art that various changes and modifications thereof may be made, and it is intended in the appended claims to cover all those changes and modifications as fall within the true spirit and scope of the present invention.

What is claimed as new and desired to be secured by Letters Patent of the United States is:

1. A cooking device comprising a completely immersible cooking vessel, an electric heating element forming a unitary part of said vessel and disposed in intimate heat exchange relationship with said vessel, electrical means associated with said vessel having an electrical characteristic which varies in response to changes in temperature of said vessel, a control unit remote from said vessel, first conductive means for supplying alternating current electrical energy from said control unit to said electric heating element, switching means connected in circuit with said heating element, second conductive means for electrically interconnecting said electrical means and said control unit, and selectively adjustable means in said control unit responsive to the variation of said electrical characteristic for selectively controlling said switching means and consequently the electrical energy supplied to said heating element.

2. The cooking device of claim 1 wherein said electrical means associated with said vessel comprises the resistance portion of said electric heating element and wherein the resistance of said resistance portion is one which varies with the temperature thereof.

3. The cooking device of claim 1 wherein said electrical means is an element separate from said heating element and disposed in heat exchange relationship with said vessel.

4. Cooking apparatus comprising a self-contained completely immersible cooking vessel having an electric heating element and a temperature sensing element built into said vessel, a control unit remote from said vessel, a conductive unit for translating electric energy from said control unit to said heating element, switching means connected in circuit with said electric heating element, conductive means for coupling an indication of an electric condition from said sensing element to said control unit, said switching means forming a part of one of said units, and selectively adjustable means in said control unit responsive to said indication for controlling said switching means and consequently the supply of electrical energy to said heating element in accordance with the temperature thereof.

5. A cooking apparatus comprising a plurality of cooking vessels each having a built-in electric heating element and a built-in heat sensing element and each being completely immersible for cleaning purposes, said heat sensing element comprising a device for producing an electrical signal variable in response to temperature changes thereof, a master control unit for supplying electrical energy to selected ones of the heating elements of said vessels for heating the same, conductive means being provided between said master control unit and said vessels so that said vessels are readily movable with respect to said master control unit, switching means forming a part of said conductive means or said control unit, selective control means for controlling cyclic operation of said switching means in response to the signal produced by said sensing element thereby selectively controlling the amount of electrical energy supplied to said heating elements in accordance with the temperature of the associated vessel.

6. In a completely immersible cooking device, the combination of a cooking vessel, an electric heating element forming a part of said vessel and disposed in intimate heat exchange relationship with said vessel, a resistor disposed in intimate heat exchange relationship with said vessel having a resistance which varies in response to changes in temperature of said vessel, a control unit remote from said vessel, first conductive means for supplying alternating current electrical energy from said control unit to said vessel, switching means forming a part of said control unit or said first conductive means, second conductive means for electrically interconnecting said resistor and said control unit, and means in said control unit responsive to the variations in resistance of said resistor selectively to control the electrical energy supplied to said heating element by cyclically operating said switching means.

7. Cooking apparatus comprising a plurality of cooking vessels each having a built-in heating unit and a built-in temperature sensing unit, each of said heating units including means responsive to current supplied thereto for heating the associated vessel, a plurality of switching means each connected in series with a different one of said heating units, each of said temperature sensing units including means for providing an electric signal indicative of the temperature of the associated vessel, a control circuit including means responsive to control signals supplied thereto for actuating said switching means to supply controlled amounts of alternating current to a plurality of loads, and a plurality of flexible connectors operatively interconnected between respective heating units of said vessels and said control circuit, said connectors each including a plurality of mutually insulated conductors respectively connected to a heating unit and an associated sensing unit, whereby the current supplied to the heating units of each of said vessels is regulated in accordance with the temperature of the associated vessels.

8. The apparatus of claim 7 wherein the temperature sensing means in each of said vessels are operatively identical, whereby said vessels may be interchangeably connected to said control circuit.

9. In a cooking vessel, the combination of a completely immersible open top container, an electric heating element disposed in heat exchange relationship with the underside of the bottom of said container, a heat sensing element operatively connected to the underside of the bottom of said container, means responsive to operation of said heat sensing element when subjected to different temperatures for selectively controlling the supply of electrical energy to said heating elements to maintain said vessel at a constant predetermined temperature, an imperforate housing for at least one of said elements, said housing being bonded to said vessel throughout an area surrounding the one of said elements which is housed therein, and means for evacuating said housing.

10. The cooking vessel of claim 9 wherein a plurality of legs are provided to support said container, and said means for evacuating said housing extends into one of said legs.

11. The cooking device of claim 1 wherein said means in said control unit includes a thyratron, a relay winding connected in the anode-cathode circuit of said thyratron, means for energizing said anode-cathode circuit from a source of alternating current, and wherein said selectively adjustable means comprises manually adjustable means for supplying an alternating current voltage between the cathode and control electrode of said thyratron, said alternating current voltage being 180 degrees out of phase with the energizing voltage for said anode-cathode circuit, and means for varying the amplitude of the anode-to-cathode voltage of said thyratron in accordance with changes in the electrical characteristics of said electrical means.

12. The cooking device of claim 3 in which said electrical means is an electrical resistor and wherein said control unit includes a transistor amplifier responsive to the variation in resistance of said resistor upon changes in temperature of said vessel for controlling the electrical energy supplied to said heating element.

13. The cooking device of claim 12 wherein said transistor amplifier comprises a transistor having a base, an emitter and a collector, and wherein said base is connected to a point on a voltage divider circuit including said resistor which voltage divider circuit is connected across a source of electrical energy.

14. The cooking device of claim 13 wherein said voltage divider circuit includes in addition to said resistor a second resistor serving as an ambient temperature compensating element whereby said electrical resistor may be positioned to receive radiant energy emitted from said vessel.

15. In a cooking device, a completely immersible vessel, an electric heating element forming a part of said vessel and disposed in intimate heat exchange relationship with said vessel, a plug receptacle mounted on said vessel, electrical terminals in said plug receptacle connected to said heating element, means for sealing the electric circuit associated with said heating element and terminals against the entrance of moisture whereby said vessel may be completely immersed in liquid for cleaning purposes, a plug connector receivable in said plug receptacle, temperature sensing means for sensing the temperature of said vessel connected to said plug connector at least when said plug connector is operatively disposed in said plug receptacle, switch means remote from said vessel and controlled by said sensing means at least when said connector is in said receptacle, and circuit means including said plug connector for electrically interconnecting said switch means and said heating element.

References Cited in the file of this patent
UNITED STATES PATENTS

| | | |
|---|---|---|
| 1,621,758 | Shaw | Mar. 22, 1927 |
| 1,936,464 | Wey | Nov. 21, 1933 |
| 2,403,843 | Beam et al. | July 9, 1946 |
| 2,448,502 | Wilson | Aug. 31, 1948 |
| 2,463,805 | Polye et al. | Mar. 8, 1949 |
| 2,522,521 | Kock | Sept. 19, 1950 |
| 2,530,643 | Berg et al. | Nov. 21, 1950 |
| 2,543,052 | Park | Feb. 27, 1951 |
| 2,550,579 | McDowell | Apr. 24, 1951 |
| 2,592,683 | Gray | Apr. 15, 1952 |
| 2,611,070 | Chandler | Sept. 16, 1952 |
| 2,621,279 | Richardson | Dec. 9, 1952 |
| 2,624,825 | Crowley | Jan. 6, 1953 |
| 2,638,574 | Webb | May 12, 1953 |
| 2,673,917 | Woodling | Mar. 30, 1954 |
| 2,686,250 | Schroeder | Aug. 10, 1954 |
| 2,703,358 | Mertler | Mar. 1, 1955 |
| 2,722,595 | Kolb | Nov. 1, 1955 |
| 2,724,040 | Mouzon | Nov. 15, 1955 |
| 2,726,297 | Vogelsberg | Dec. 6, 1955 |
| 2,744,995 | Jepson | May 8, 1956 |
| 2,751,550 | Chase | June 19, 1956 |
| 2,760,174 | Burtt et al. | Aug. 21, 1956 |
| 2,775,684 | Berliner | Dec. 25, 1956 |
| 2,806,122 | Thunander | Sept. 10, 1957 |
| 2,816,207 | Boggs | Dec. 10, 1957 |
| 2,859,402 | Schaeve | Nov. 4, 1958 |

FOREIGN PATENTS

| | | |
|---|---|---|
| 215,539 | Great Britain | May 15, 1924 |

OTHER REFERENCES

Weeks, Abstract of application Serial Number 65,938, published Sept. 25, 1951, O.G. Vol. 650, page 1196.